Figure 1:
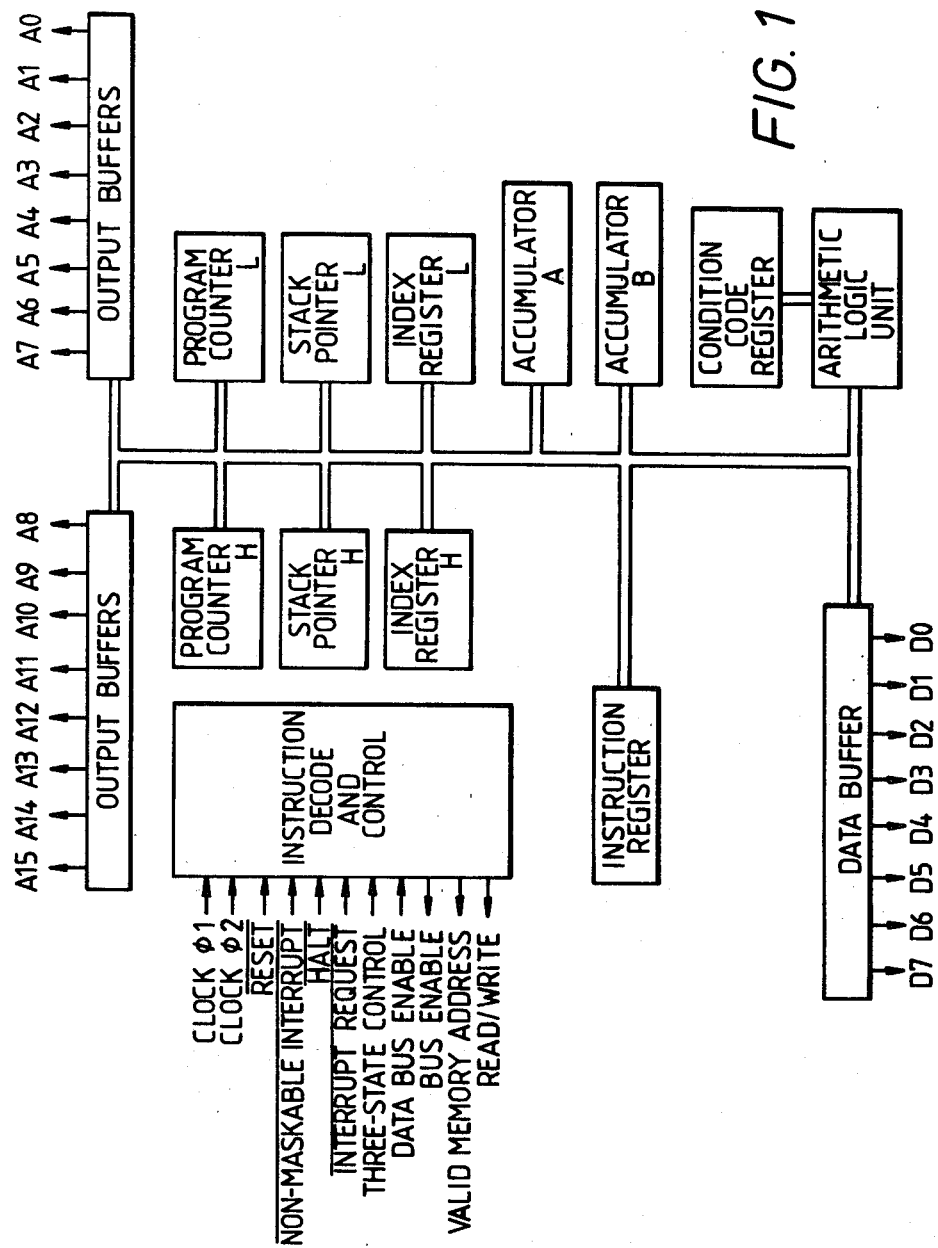

United States Patent [19]

Jones

[11] 4,399,537
[45] Aug. 16, 1983

[54] CONTROL CIRCUIT AND FUEL BURNER INCORPORATING A CONTROL CIRCUIT

[75] Inventor: Gregory E. Jones, Solihull, England

[73] Assignee: British Gas Corporation, London, England

[21] Appl. No.: 237,765

[22] Filed: Feb. 24, 1981

[30] Foreign Application Priority Data

Nov. 6, 1980 [GB] United Kingdom ............... 8035736

[51] Int. Cl.³ .......................................... G06F 11/00
[52] U.S. Cl. ...................................... 371/14; 364/183; 371/62; 431/24
[58] Field of Search .......................... 371/62, 66, 14; 340/577, 578, 579; 364/183, 184; 431/24, 25

[56] References Cited

U.S. PATENT DOCUMENTS

| | | | |
|---|---|---|---|
| 2,825,012 | 2/1958 | Consolver et al. | 340/577 |
| 3,320,440 | 5/1967 | Reed | 371/62 |
| 3,727,073 | 4/1973 | Cade | 340/579 |
| 3,786,433 | 1/1974 | Notley et al. | 371/62 |
| 3,795,800 | 3/1974 | Nimmo | 371/62 |
| 3,919,533 | 11/1975 | Ienolf, Jr. et al. | 371/62 |
| 4,280,184 | 7/1981 | Weiner et al. | 340/578 |
| 4,394,003 | 12/1981 | Kakizawa et al. | 371/62 |

OTHER PUBLICATIONS

Anderson et al., Failure Indicator for Multiple Signals, IBM Technical Disclosure Bulletin, vol. 24, No. 1B, Jun. 1981, pp. 653–654.

Primary Examiner—Charles E. Atkinson
Attorney, Agent, or Firm—Oblon, Fisher, Spivak, McClelland & Maier

[57] ABSTRACT

A fail-safe supervisory circuit for a microprocessor-controlled fuel burner has a diode pump circuit (C4, C5, D7, D8) triggered by a resettable monostable (R7, T2, R8, C3) responsive to an encoded signal from the microprocessor, to act as a watch-dog timer. A triggered bistable (D1, T1, R2, IC8) provides a RESET signal on power-on or manually. A direct connection from this bistable to the monostable enables the timer circuit until the microprocessor program commences.

5 Claims, 2 Drawing Figures

CONTROL CIRCUIT AND FUEL BURNER INCORPORATING A CONTROL CIRCUIT

DESCRIPTION

This invention relates to control circuits and, in particular, to self-testing or fail-safe control circuits. It finds application in supply controls for fuel burners, especially gas burners.

Present-day fuel burner control systems are subject to very stringent safety requirements. Microprocessor-based controls have the facility to meet these requirements and also offer potential advantages by way of flexibility of start-up program, improved presnetation of data to the operator and scope for using the control unit to undertake other process control functions such as temperature and fuel/air ratio.

Computers used as part of a control system will have several reset requirements. These include power-on reset, operator-generated reset, power-loss reset and a time-out reset. The last requirement is frequently embodied as a watch-dog timer, and in the case of a fail-safe system, the watch-dog timer could halt the processor when it is not re-triggered. If a high degree of safety is required then all of the circuits must be fail-safe or testable during normal operation of the control. A control circuit which meets these requirements has been devised.

According to the present invention there is provided a supervisory circuit for a control system having an output adapted to be brought to a predefined stated in the event of failure of a component or malfunctioning of the system, or the supervisory circuit, including first input means responsive to a predetermined input signal to produce a trigger pulse in response thereto, resettable monostable circuit means responsive to said trigger pulse to produce an alternating output signal in response to a predetermined sequence of trigger pulses and pump circuit means responsive to said alternating signal to produce a first output signal and to the absence of said alternating signal to produce a second output signal.

Figure 2:
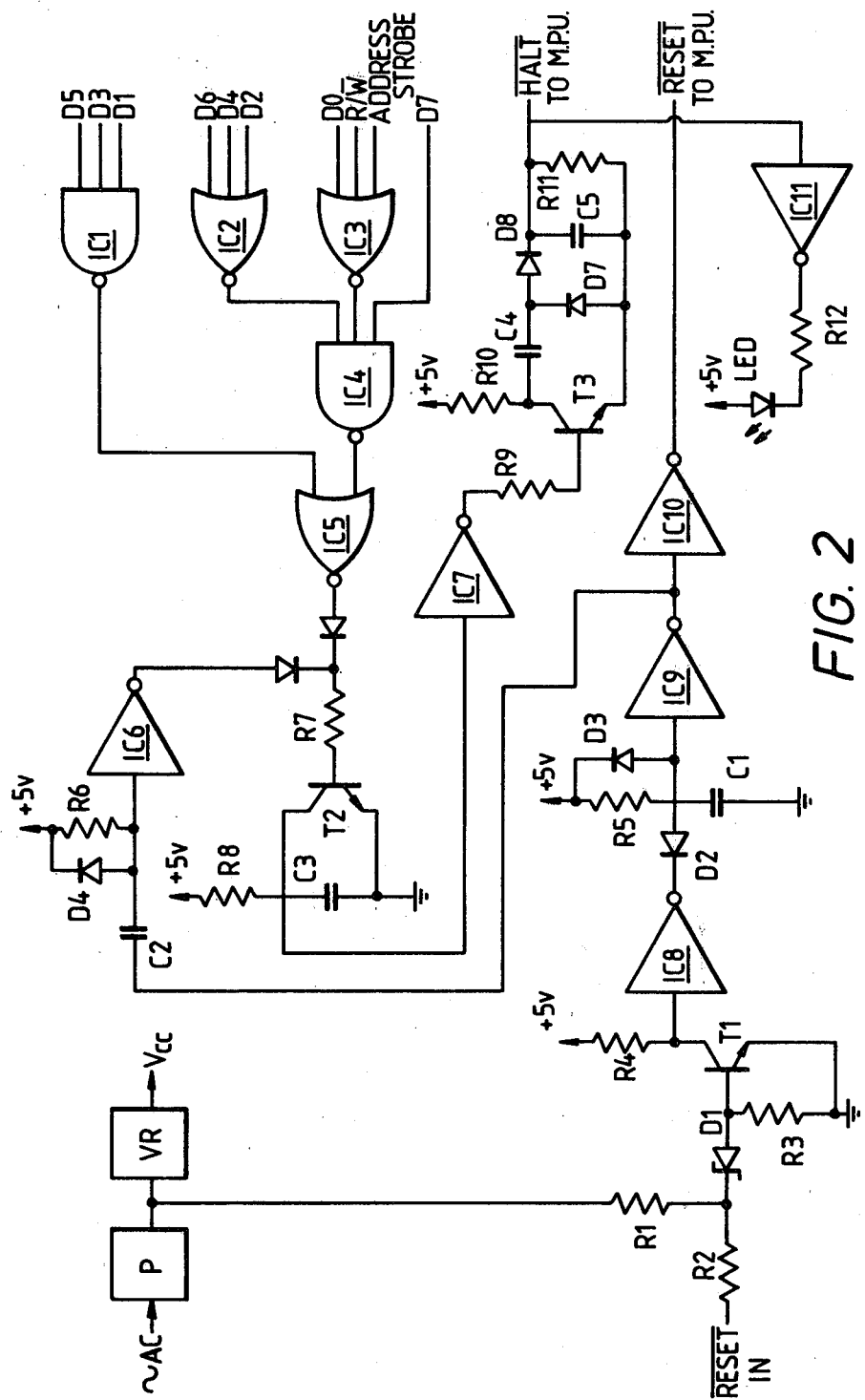

An embodiment of the invention will now be described by way of example with reference to the accompaying drawings in which:

FIG. 1 is a block diagram showing the architecture of a typical eight-bit microprocessor, and FIG. 2 is a diagram of a watch-dog timer and reset circuits suitable for use with the microprocessor.

Referring now to the drawings, FIG. 1 is a block diagram of a typical eight-bit microprocessor. Data are manipulated within the microprocessor and are transferred in and out by way of a data bus D0–D7. Proper operation required that timing and control signals be provided to accomplish specific functions and that other signal lines be monitored by external circuits to determine the state of the processor. Basic system timing is provided by two clock inputs $\emptyset_1$, $\emptyset_2$ which accept a two-phase non-overlapping clock that runs at the rail level.

A suitable circuit to control the microprocessor is shown in FIG. 2. An alternating current supply line is fed to the input AC of a rectifier P. The rectified output passes by way of a voltage regulator VR to the supply rail $V_{cc}$ of the microprocessor. The unregulated output of the rectifier is monitored by a potential divider R1, R3 in series with a zener diode D1. In normal operation, the voltage across the zener diode is higher than its characteristic voltage and it conduits, turning on a transistor switch T1 coupled to its anode. An inverter IC8 with Schmitt trigger input, is connected to the collector load resistor R4 and its output goes high whenever the transistor conducts. The inverter is coupled by way of a diode D2 to a second inverter IC9. When the output is high, this diode is reverse biased and the further inverter's output is low. If the voltage across the zener diode D1 drops below the zener voltage, it ceases to conduct and the base current to the transistor T1 is cut off. The transistor switches off, the input to the first inverter goes high and its output goes low, forward biasing the output diode discharging its reservoir capacitor C1.

A third inverter IC10 is coupled to the second inverter IC9 and together they act as a non-inverting buffer to provide a low, power-on reset signal to the microprocessor. The capacitor C1 at the input to the second inverter is connected to the microprocessor's power supply $V_{cc}$ through a resistor R5, maintaining the second inverter's input below its switching point for a time determined by the time constant of the circuit R5C1. This signal is inverted by the second inverter IC9 and re-inverted by the third inverter IC10 to give the low reset signal required by the microprocessor. When the voltage at the input to the second inverter rises above its switching point, then the reset line to the microprocessor is brought high and the computer can execute its program. When power is removed a parallel diode D3 acts as a discharge path, whilst a further diode D2 blocks the alternative charging route through the first inverter IC8. The circuit is exercised and thus tested each time power is applied to the controller.

A further connection to the base of the first transistor T1 by way of a limiter resistor R2 provides an operator reset facility. Normally the input is left floating, but when it is grounded, it biases the base potential divider R1, R2 to give a low voltage signal equivalent to a power-down reset.

Correct functioning of the microprocessor is monitored by means of a watch-dog timer comprising a diode pump circuit. Pulses from the microprocessor are fed by way of a combination of NAND and NOR gates IC1–IC5, a switching transistor T2 and inverter IC7 to a diode pump circuit. If this pump circuit is not continuously exercised by the microprocessor, it triggers the HALT input of the microprocessor, switching off the controller.

The input gates IC1–IC5 decode information from the data and control bus, to present a high signal to the switching transistor T2 only when a particular data word is written to a specific address location. This signal is short (less than a microsecond) but is sufficiently long to turn on the switching transistor T2, discharging a reservoir capacitor C3, which charges again when the transistor switches off. The charging time is controlled by the time constant R8C3 set by the collector load resistor R8. During the charging interval, the input to an inverter IC7 is low and its output high. The microprocessor is programmed to trigger the watch-dog timer at such a rate as to generate a square wave with approximately 50% duty cycle at the output of the inverter IC7. This square wave is used to switch a transistor T3 driving the diode pump circuit C4, C5, D7, D8. The output voltage of the pump circuit is substantially constant only when an alternating voltage is applied to the input. If the alternating voltage ceases or a component in the diode pump circuit fails, then a shunt resistor R11 will discharge the reservoir capacitor C5 and pull the output low, thereby halting the microprocessor. Likewise, if the diode pump trigger rate is too low, the reservoir capacitor will not charge sufficiently to hold the microprocessor on. If the microprocessor triggers the watch-dog timer too frequently then the input resettable monostable T2, C3, R8, IC7 has no chance to time-out so a direct voltage is supplied to the switching transistor T3 and the diode pump circuit will not operate.

A non-resettable monostable C2, D4, R6, IC6 triggered by the RESET circuit provides an alternative input to the diode pump circuit which provides the necessary input signal on start-up when the microprocessor output is inhibited. This ensures that the HALT signal to the microprocessor is removed for a sufficient time to permit the program execution to commence, re-triggering the watch-dog timer.

The output of the watch-dog timer is monitored by an inverter circuit IC11 which drives a light-emitting diode LED to provide a visual indication to the operator that the control circuit is functioning normally.

Although the invention has been described with reference to a microprocessor it is not limited to such controls. The supervisory circuit described will work equally well with other forms of computer control circuit.

I claim:

1. A fail-safe supervisory system for a control computer which generates repetitively a set of predetermined signals indicative of computer operation, comprising:
    first input means responsive to the set of signals repetitively generated by said computer to produce trigger pulses based thereon;
    resettable monostable circuit means responsive to said trigger pulses for producing an alternating signal when the frequency of said trigger pulses is below a first predetermined level; and
    diode pump circuit means responsive to said alternating signal for producing an output signal coupled to said computer and allowing the computer to operate when the frequency of the alternating signal is above a second predetermined level lower than said first predetermined level.

2. A fail-safe supervisory system for a control computer which generates repetitively a set of predetermined signals indicative of computer operation, comprising:
    first input means responsive to the set of signals repetitively generated by the computer to produce trigger pulses based thereon;
    resettable monostable circuit means responsive to said trigger pulses for producing an alternating signal when the frequency of the trigger pulses is below a first predetermined level;
    diode pump circuit means responsive to said alternating signal for producing an output signal coupled to said computer and allowing the computer to operate when the frequency of the alternating signal is above a second predetermined level which is lower than said first predetermined level; and
    bistable circuit means connected to a power supply for said computer to produce an output signal in response to a drop in power supply voltage, said output signal of said bistable circuit means activating a reset of the computer.

3. A supervisory system as claimed in claim 2, wherein said bistable circuit means has a predetermined input trigger level that produces said output signal when the output signal of the power supply voltage drops below said predetermined input trigger level of said bistable circuit.

4. A supervisory system as claimed in claim 3, wherein said bistable circuit means comprises:
    means for producing an additional input signal equivalent to the output signal of the power supply falling to a predetermined level in order to test the operability of the bistable circuit means, said additional input signal coupled to said resettable monostable circuit means and being factored into the production of said alternating signal.

5. A supervisory system as claimed in claim 2, wherein said bistable circuit means is connected to said resettable monostable circuit means to reactivate said monostable circuit means when the power supply voltage returns to a predetermined operational level.

* * * * *